Feb. 22, 1927.

G. A. TAYLOR 1,618,239

TACK

Filed Dec. 17, 1923

INVENTOR:
George A. Taylor
by MacLeod, Calver, Copeland & Dike
ATTYS.

Patented Feb. 22, 1927.

1,618,239

UNITED STATES PATENT OFFICE.

GEORGE A. TAYLOR, OF BOSTON, MASSACHUSETTS.

TACK.

Application filed December 17, 1923. Serial No. 681,094.

My invention relates to improvements in tacks or nails and has for its object to provide an article which may be easily driven into the work and will remain firmly secured in the work unless intentionally withdrawn therefrom.

My improved tack is especially adaptable for use in upholstering automobiles, considerable difficulty having been encountered in the past because tacks of the ordinary type work loose.

My improved tack is provided with a shank, the point portion of which is concentric with respect to the head, and the intermediate portion of which forms a helix. In my preferred construction, I place the helix relatively near the head. The helical portion preferably forms one complete turn and has a relatively great lead.

In the following description, I have used the words "helix" and "helical" as referring to a structure in which the body of the wire is bodily offset progressively and forms a true helix as distinguished from a wire which is merely twisted on its axis or from a cylindrical body having an exterior spiral thread, as in the case of an ordinary screw.

The invention will be fully understood from the following description when taken in connection with the accompanying drawings, and the novel features thereof will be pointed out and clearly defined in the claims at the close of this specification.

In said drawings—

Figure 1:
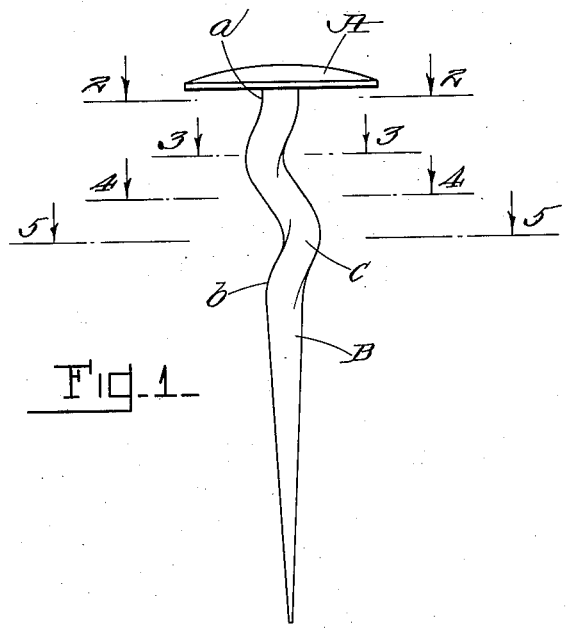
Figure 3:
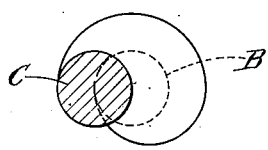
Figure 4:
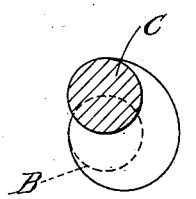
Figure 5:
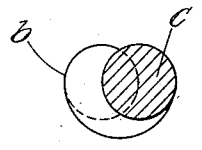
Figure 2:

Fig. 1 is a side elevation of my improved tack, and

Figs. 2, 3, 4 and 5 are enlarged transverse sections taken on the lines 2—2, 3—3, 4—4, and 5—5, of Fig. 1, respectively.

Referring now to Fig. 1, A represents the head of the tack and B the shank. The shank is made integral with the head and is concentric therewith. The shank B tapers to a point at its lower end in the usual manner. The shank B is progressively offset to form a bodily helical portion C which extends from a point $a$ adjacent the head to the point $b$ on the shank. The helical portion C, as shown, consists of one complete helical turn starting at the point $a$ on one side of the shank adjacent the head, and terminating at the like point $b$ lower down the shank. The lead or pitch of the helix is relatively steep, being preferably greater than one to one, or 45°, to facilitate the driving of the tack. The several positions of the body of the shank throughout the helical portion starting from the beginning of the helix are shown in Figs. 2 to 5, respectively.

I am aware that it has been common practice to form tacks or nails having a square or other non-circular cross-section with a twist, the axis of the wire forming a straight line. I am aware that it has also been proposed to form a tack or other fastener with a shank having an exterior screw thread. I believe, myself, however, to be the first to give to a portion of the shank of a tack or nail a progressively offset or bodily helical form. This construction makes it possible to use a wire of circular cross-section and to form the body in dies such as are commonly employed in tack-making. Furthermore, even if the amount of the offset be very slight the tack will hold firmly in wood.

My invention is also equally applicable to a headless tack such as is used by pattern makers.

What I claim is—

1. An improved tack comprising a head and a shank, the shank having the minor portion of its length adjacent the head formed bodily helical and having its major portion beyond said helical portion tapered gradually from said helical portion to the end of said shank.

2. An improved tack comprising a head and a shank, the shank having the minor portion of its length adjacent the head formed bodily helical, and having an elongated tapered end portion constituting the major portion of said shank.

In testimony whereof I affix my signature.

GEORGE A. TAYLOR.